United States Patent
Tani (10) Patent No.: US 9,698,631 B2
(45) Date of Patent: Jul. 4, 2017

(54) WIRELESS POWER SUPPLY DEVICE

(71) Applicant: Panasonic Intellectual Property Management Co., Ltd., Osaka (JP)

(72) Inventor: Hiroyuki Tani, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 342 days.

(21) Appl. No.: 14/615,447

(22) Filed: Feb. 6, 2015

(65) Prior Publication Data
US 2015/0311754 A1 Oct. 29, 2015

(30) Foreign Application Priority Data
Apr. 23, 2014 (JP) ................. 2014-089168

(51) Int. Cl.
| | | |
|---|---|---|
| *H02J 17/00* | (2006.01) | |
| *H02J 50/40* | (2016.01) | |
| *H02J 50/27* | (2016.01) | |
| *H02J 50/23* | (2016.01) | |

(52) U.S. Cl.
CPC ............ *H02J 50/40* (2016.02); *H02J 50/23* (2016.02); *H02J 50/27* (2016.02)

(58) Field of Classification Search
CPC H01Q 1/243; H02J 17/00; H02J 50/20; H02J 50/23; H02J 50/27; H02J 50/40; H04B 5/0037; H04B 5/0075; H04B 5/0081
USPC ........................................................ 307/104
See application file for complete search history.

(56) References Cited

U.S. PATENT DOCUMENTS

| | | | |
|---|---|---|---|
| 2010/0201201 A1* | 8/2010 | Mobarhan | ............... H02J 5/005 307/104 |
| 2012/0126631 A1 | 5/2012 | Amma et al. | |
| 2012/0212072 A1* | 8/2012 | Miyabayashi | ....... H04B 5/0037 307/104 |
| 2012/0228957 A1 | 9/2012 | Miyauchi | |

(Continued)

FOREIGN PATENT DOCUMENTS

| | | |
|---|---|---|
| JP | 63-294237 | 11/1988 |
| JP | 2-065529 | 3/1990 |
| JP | 2000-194812 | 7/2000 |

(Continued)

*Primary Examiner* — Levi Gannon
(74) *Attorney, Agent, or Firm* — Panasonic IP Management; Kerry S. Culpepper (57) ABSTRACT

A wireless power supply device is capable of supplying constant power without fluctuation in transmission efficiency even when small-sized antennas in which the power fluctuates due to the transmission distance are used. The wireless power supply device includes a first power receiving antenna having a power receiving surface facing a power transmission surface of a first transmission antenna and a second power receiving antenna having a power receiving surface facing a power transmission surface of a second power transmission antenna, both are integrally formed and connected to a power supply target. A direction in which the power receiving surface of the first power receiving antenna faces the power transmission surface of the first power transmission antenna is parallel to a direction in which the power receiving surface of the second power receiving antenna faces the power transmission surface of the second power transmission antenna.

9 Claims, 9 Drawing Sheets (56) References Cited

U.S. PATENT DOCUMENTS

2012/0326660 A1 12/2012 Lu et al.
2013/0082535 A1 4/2013 Miyauchi et al.

FOREIGN PATENT DOCUMENTS

| JP | 2002-280241 | 9/2002 |
| JP | 2006-287451 | 10/2006 |
| JP | 2011-010472 | 1/2011 |
| JP | 2012-186949 | 9/2012 |
| JP | 2013-085436 | 5/2013 |

* cited by examiner

WIRELESS POWER SUPPLY DEVICE

TECHNICAL FIELD

The technical field relates to a wireless power supply device transmitting/receiving the power by using electromagnetic waves (microwaves) in a wireless manner.

BACKGROUND

A technique of transmitting power by using electromagnetic waves (microwaves) and supplying the power in a wireless manner has been developing in recent years. As an example of a wireless power supply technique by electromagnetic waves, there is a system in which magnetic coupling and resonance are used in a short distance of several meters or less, such as in electromagnetic induction and magnetic resonance, by using microwaves in a frequency band from several 100 kHz to several MHz. In such a system, a wireless power transmission method in which a power receiving device to which the power is supplied is fixed at a constant position from the power supply device which transmits the power. A method of moving the position of a power transmission antenna in accordance with the power transmission position for transmitting the power by wireless with respect to a target in which the position of the power transmission position varies due to movement of the power receiving device existing in a short distance.

On the other hand, as a method of transmitting the power by wireless to a target in which the power transmission position varies in a case where a distance from the power transmission device to the power receiving device is long and the power receiving device is in a far distance, there exists a system of transmitting the power by using microwaves. It is possible to transmit microwaves to the power receiving device over a far distance by using microwaves in a range from several hundred MHz to several GHz. As examples of such wireless power transmission systems, there are proposed, for example, a cosmic solar power generation system in which an artificial satellite having solar power panels is launched above the equator and the power generated by solar light is transmitted to the power receiving device on earth, a system of transmitting the power to the power receiving device arranged in a far isolated island and other systems.

The wireless power transmission device by using microwaves can transmit the power to a target in which the position of the power receiving device varies in principle. As the power transmission method in the above case, there is a method in which, when the power transmission position varies or when there are plural power transmission positions, the transmission side recognizes the position of the power receiving device and transmits the power so that phases of the power to be transmitted are aligned at the position. It is possible to transmit the power efficiently by using the wireless power transmission method. As a specific example, there is a wireless power transmission device in which pilot signals from a power receiving antenna of a power receiving device are received by a power transmission antenna of a power supply device for recognizing the position of the power receiving device and the power supply device controls phases of the power based on the received information (for example, refer to JP-A-2006-287451 (Patent Document 1).

SUMMARY

Figure 8:
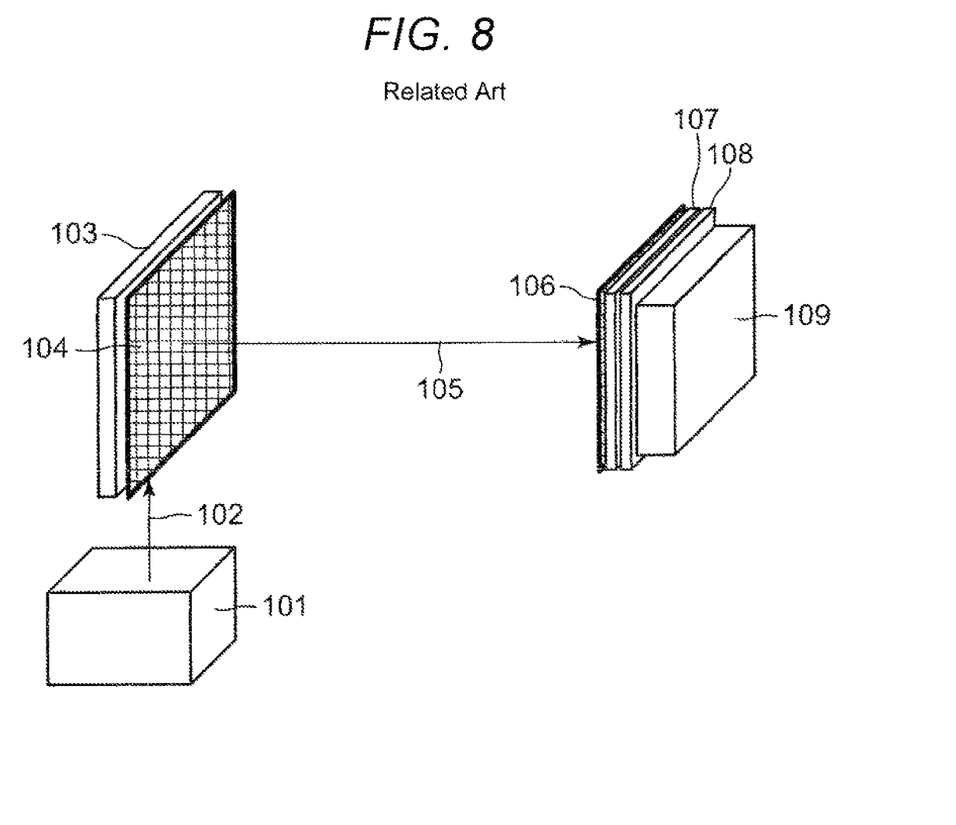
FIG. 8 is a view showing a basic structure of a related-art wireless power supply device.

FIG. 8 shows a related-art wireless power supply device. In FIG. 8, the power is supplied from a microwave generator 101 to a power transmission antenna 103 through a microwave transmission line 102 (including a divider, a microwave amplifier in some cases). Microwaves 105 emitted from a power transmission surface 104 of the power transmission antenna 103 are received by a power receiving surface 106 of a power receiving antenna 107. After the microwaves received by the power receiving surface 106 are converted into the power by a power conversion circuit part 108, the power is supplied to a power supply target part 109. Here, the power transmission surface 104 of the power transmission antenna 103 and the power receiving surface 106 of the power receiving antenna 107 are arranged so as to face each other.

Figure 9:
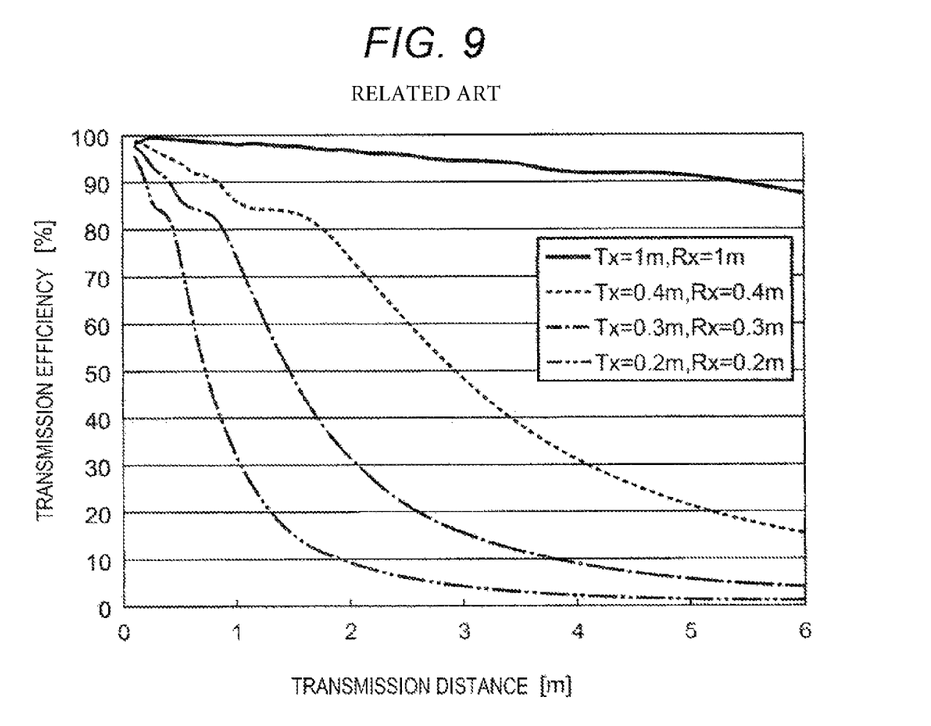
FIG. 9 is a graph showing the relation between the transmission distance and the transmission efficiency of a related-art wireless power supply device.

FIG. 9 is a graph showing the relation between the transmission distance and transmission efficiency at a frequency 5.8 GHz in the structure shown in FIG. 8. In FIG. 9, a horizontal axis indicates the transmission distance (m) and a vertical axis indicates the transmission efficiency (%). In the graph of FIG. 9, under conditions in which circular planar antennas are used as the power transmission antenna 103 and the power receiving antenna 107, and a diameter of the power transmission antenna 103 is denoted as Tx and a diameter of the power receiving antenna 107 is denoted as Rx, results are shown by a solid line when Tx is 1 m and Rx is 1 m, results are shown by a broken line when Tx is 0.4 m and Rx is 0.4 m, results are shown by a dashed line when Tx is 0.3 m and Tx is 0.3 m and results are shown by a double-dashed line when Tx is 0.2 m and Rx is 0.2 m. As shown in the graph of FIG. 9, the power can be supplied stably even when the distance varies in a level of efficiency 90% or more within a range of approximately 5 m in the transmission distance by setting Tx and Rx to a size to 1 m. On the other hand, the transmission efficiency largely varies in accordance with the transmission distance when the size of Tx and Rs is reduced. That is, the transmission efficiency is largely reduced as the power transmission distance is increased.

In order to solve the above problems, a method of increasing the power to be transmitted when the power transmission distance is long and the power receiving antenna 107 moves away from the power transmission antenna 103 and reducing the power when the power transmission distance is short, namely, the method of controlling the power to be transmitted in accordance with the power transmission distance may be considered. In this method, it is necessary that the position in the power receiving side is known by the transmission side. Accordingly, the above related-art wireless power supply device requires a position recognition part for recognizing the power transmission position of a power supply target by means such as a camera, a sensor and information communication and a power control part for calculating the distance based on the position and controlling the power to be transmitted in accordance with the calculated distance. It is also necessary that the microwave generator in the related-art wireless power transmission device includes a power source which can control the power, which complicates the device structure.

A wireless power supply device according to various exemplary embodiments discussed herein solves the problem of transmission efficiency fluctuating in accordance with the transmission distance in the case of using small-sized antennas. The wireless power supply device is capable of supplying constant power even when using small-sized antennas in which the power varies in accordance with the transmission distance and capable of transmitting the power stably by suppressing fluctuation of transmission efficiency due to the power transmission position.

According to an embodiment, there is provided a wireless power supply device including a microwave generator for generating microwaves, a first power transmission antenna to which microwaves generated by the microwave generator are supplied, a second power transmission antenna to which microwaves generated by the microwave generator are supplied, a first power receiving antenna provided between a power transmission surface of the first power transmission antenna and a power transmission surface of the second power transmission antenna, having a power receiving surface facing the power transmission surface of the first power transmission antenna and a second power receiving antenna provided between the power transmission surface of the first power transmission antenna and the power transmission surface of the second power transmission antenna, having a power receiving surface facing the power transmission surface of the second power transmission antenna, in which the first power receiving antenna and the second power receiving antenna are integrally formed and connected to a power supply target, a direction in which the power receiving surface of the first power receiving antenna faces the power transmission surface of the first power transmission antenna is parallel to a direction in which the power receiving surface of the second power receiving antenna faces the power transmission surface of the second power transmission antenna.

In the wireless power supply device, fluctuation of transmission efficiency of the power transmitted from the first power transmission antenna and the second power transmission antenna to the power supply target can be suppressed and the power can be stably supplied to the power supply target even when the first power receiving antenna and the second power receiving antenna which are integrally formed move in an area between the first power transmission antenna and the second power transmission antenna and arranged in an arbitrary position.

In the wireless power supply device, if is not necessary to recognize a power transmission position and control the power to be transmitted and constant power supply can be performed even in an antenna structure in which the transmission efficiency fluctuates due to the power transmission position, therefore, it is possible to suppress fluctuation of transmission efficiency due to the power transmission position and to perform stable wireless power transmission.

DESCRIPTION OF EMBODIMENTS

A wireless power supply device according to an embodiment includes a microwave generator for generating microwaves, a first power transmission antenna to which microwaves generated by the microwave generator are supplied, a second power transmission antenna to which microwaves generated by the microwave generator are supplied, a first power receiving antenna provided between a power transmission surface of the first power transmission antenna and a power transmission surface of the second power transmission antenna, having a power receiving surface facing the power transmission surface of the first power transmission antenna and a second power receiving antenna provided between the power transmission surface of the first power transmission antenna and the power transmission surface of the second power transmission antenna, having a power receiving surface facing the power transmission surface of the second power transmission antenna, in which the first power receiving antenna and the second power receiving antenna are integrally formed and connected to a power supply target, a direction in which the power receiving surface of the first power receiving antenna faces the power transmission surface of the first power transmission antenna is parallel to a direction in which the power receiving surface of the second power receiving antenna faces the power transmission surface of the second power transmission antenna.

In the wireless power supply device according to the first embodiment having the above structure, even when a small-sized antennas in which the power fluctuates due to the transmission distance are used, the constant power supply can be performed and it is possible to suppress fluctuation of transmission efficiency due to the power transmission position and to perform stable wireless power transmission.

In the wireless power supply device according to the second embodiment, the power transmission surface of the first power transmission antenna and the power transmission surface of the second power transmission antenna may be arranged so as to face each other, and the power receiving surface of the first power receiving antenna and the power receiving surface of the second power receiving antenna may be arranged in an area where the power transmission surface of the first power transmission antenna faces the power transmission surface of the second power transmission antenna in the first embodiment.

In the wireless power supply device according to the third embodiment, plural microwave generators according to the first or second embodiment may be provided and configured to supply the same power to the first power transmission antenna and the second power transmission antenna.

The wireless power supply device according to the fourth embodiment further includes a microwave divider for dividing the power supplied from the microwave generator, in the first or second embodiment, in which the same power may be supplied to the first power transmission antenna and the second power transmission antenna from the microwave divider.

In the wireless power supply device according to the fifth embodiment, in the first to fourth embodiment, the first power transmission antenna and the second transmission antenna may have the same structure, and the first power receiving antenna and the second power receiving antenna may nave the same structure.

In the wireless power supply device according to the sixth embodiment, in the first to fifth embodiment, the power supply target to which the power from the first power receiving antenna and the second power receiving antenna is supplied may be integrally formed with the first power receiving antenna and the second power receiving antenna.

In the wireless power supply device according to the seventh embodiment, in the first to sixth embodiment, the first power transmission antenna and the second power transmission antenna may transmit microwaves of linearly polarized waves, and vibration directions of electric fields may be different in microwaves transmitted from the first power transmission antenna and microwaves transmitted from the second power transmission antenna.

In the wireless power supply device according to the eighth embodiment, in the first to seventh embodiment, the first power transmission antenna and the second power transmission antenna may transmit microwaves of linearly polarized waves, and vibration directions of electric fields may be orthogonal to each other in microwaves transmitted from the first power transmission antenna and microwaves transmitted from the second power transmission antenna.

In the wireless power supply device according to the ninth embodiment, in the first to eighth embodiment, the first power receiving antenna and the second power receiving antenna may be formed of a microstrip substrate, respective power receiving surfaces of the first power receiving antenna and the second power receiving antenna may be formed by conductive patterns provided on both surfaces of the microstrip substrate, and a ground surface provided in the microstrip substrate may be used in common by the first power receiving antenna and the second power receiving antenna.

In the wireless power supply device according to the tenth embodiment, in the first to ninth embodiment, plural pairs of power receiving antennas having the same structure as the first power receiving antenna and the second power receiving antenna which are integrally formed may be provided in an area where the power transmission surface of the first power transmission antenna faces the power transmission surface of the second power transmission antenna which are arranged so as to face each other.

Hereinafter, a wireless power supply device according to various exemplary embodiments will be explained with reference to the attached drawings.

Embodiment 1

Figure 1:
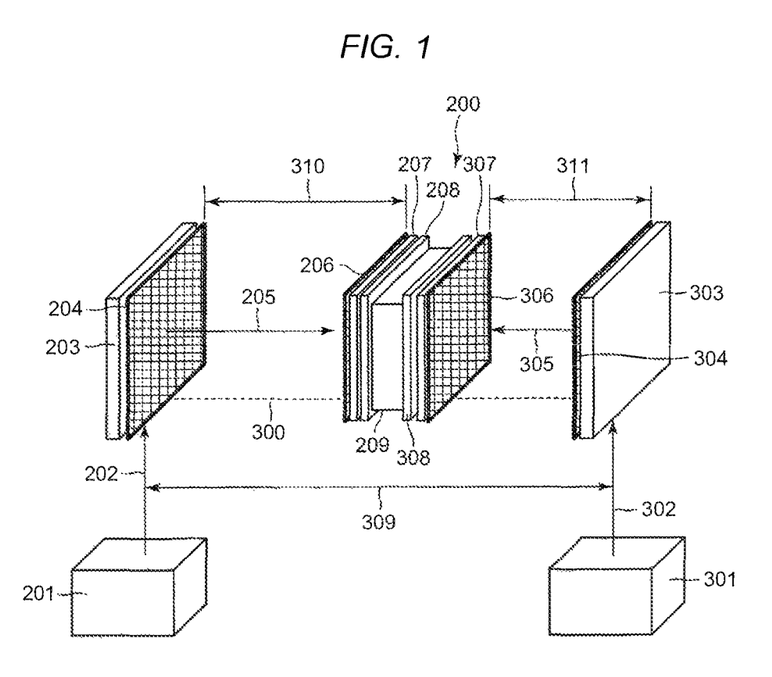
FIG. 1 is a view showing a basic structure of a wireless power supply device according to Embodiment 1.

FIG. 1 shows a basic structure of a wireless power supply device according to Embodiment 1. A first microwave generator 201 for generating electromagnetic waves (microwaves) transmits microwaves to a first power transmission antenna 203 through a first microwave transmission line 202 to supply constant power. The first microwave transmission line 202 may include a divider and a microwave amplifier in some cases. First microwaves 205 are emitted from a power transmission surface 204 of the first power transmission antenna 203 and received by a power receiving surface 206 of a first power receiving antenna 207. After the first microwaves 205 received by the power receiving surface 206 of the first power receiving antenna 207 are converted into power by a first power conversion circuit part 208, the power is supplied to a power supply target part 209.

A second microwave generator 301 forming electromagnetic waves (microwaves) transmits microwaves to a second power transmission antenna 303 through a second microwave transmission line 302 to supply constant power. The second microwave transmission line 302 may include a divider and a microwave amplifier in some cases. Second microwaves 305 are emitted from a power transmission surface 304 of the second power transmission antenna 303 and received by a power receiving surface 306 of a second power receiving antenna 307. After the second microwaves 305 received by the power receiving surface 306 of the second power receiving antenna 307 are converted into the power by a second power conversion circuit part 308, the power is supplied to the power supply target part 209.

In the wireless power supply device according to Embodiment 1, the power supply target part 209 is arranged on a straight line 300 connecting between the first power transmission antenna 203 and the second power transmission antenna 303 as shown in FIG. 1. That is, the power transmission surface 204 of the first power transmission antenna 203 and the power transmission surface 304 of the second power transmission antenna 303 are arranged so as to face each other, and the power receiving surface 206 of the first power receiving antenna 207 and the power receiving surface 306 of the second power receiving antenna 307 are arranged in an area in which the power transmission surface 204 of the first power transmission antenna 203 faces the power transmission surface 304 of the second power transmission antenna 303.

A power supply target 200 including the power supply target part 209 has the first power receiving antenna 207, the power conversion circuit part 208, the second power receiving antenna 307 and the second power conversion circuit part 308. The power receiving surface 206 of the first power receiving antenna 207 and the power transmission surface 204 of the first power transmission antenna 203 are arranged so as to face each other, which are provided at a position where the transmission efficiency is the highest. Similarly, the power receiving surface 306 of the second power receiving antenna 307 and the power transmission surface 304 of the second power transmission, antenna 303 are provided so as to face each other, which are provided at a position where the transmission efficiency is the highest.

Accordingly, in the wireless power supply device according to Embodiment 1, the flat-plate shaped power receiving surface 206 of the first power receiving antenna 207 and the flat-plate shaped power transmission surface 204 of the first power transmission antenna 203 are arranged in a parallel state, which are formed so that vertical lines extending from respective central points approximately correspond to the same straight line. Similarly, the flat-plate shaped power receiving surface 306 of the second power receiving antenna 307 and flat-plate shaped the power transmission surface 304 of the second power transmission antenna 303 are arranged in a parallel state, which are formed so that vertical lines extending from respective central points approximately correspond to the same straight line. In the structure of Embodiment 1, the respective power transmission surfaces 204, 304 of the first power transmission antenna 203 and the second power transmission antenna 303 and the respective power receiving surfaces 206, 306 of the first power receiving antenna 207 and the second power receiving antenna 307 are formed so that vertical lines extending from the respective central points approximately correspond to the same straight line.

Figure 2:
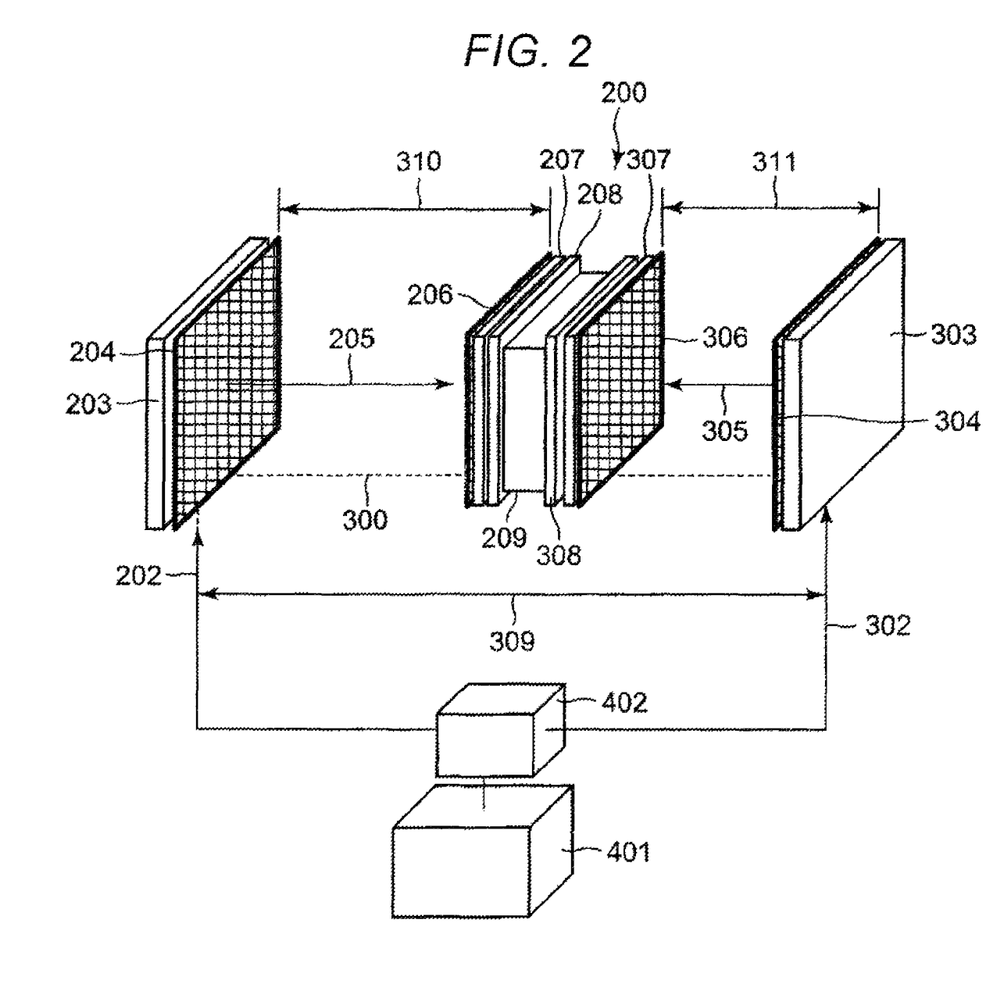
FIG. 2 is a view showing another structure of the wireless power supply device according to Embodiment 1.

FIG. 2 is a view showing another structure of the wireless power supply device according to Embodiment 1. In the structure shown in FIG. 2, the power supply to the first power transmission antenna 203 and the second power transmission antenna 303 is performed by electromagnetic waves (microwaves) generated by one microwave generator 401. In the wireless power supply device shown in FIG. 2, the microwave power generated by the microwave generator 401 is divided into two in a microwave divider 402, and the power is supplied to the first power transmission antenna 203 and the second power transmission antenna 303.

According to the structures shown in FIG. 1 and FIG. 2, in the case where the antenna size is small to such a degree that the transmission efficiency of the first microwaves 205 and the second microwaves 305 fluctuates due to the variation of a distance 310 between the first power receiving antenna 207 and the first power transmission antenna 203 and a distance 311 between the second power transmission antenna 303 and the second power receiving antenna 307, the power supply by microwaves can be performed with approximately constant transmission efficiency even when positions of the power receiving antennas (207, 307) of the power supply target 200 vary as long as the power supply target 200 is provided in a position on the straight line 309 sandwiched between the first power transmission antenna 203 and second power transmission antenna 303. For example, the transmission efficiency of the first microwaves 205 is reduced as the distance 310 between the first power transmission antenna 203 and the first power receiving antenna 207 becomes longer. Conversely, the transmission efficiency of the second microwaves 305 is increased as the distance 311 between the second power transmission antenna 303 and the second power receiving antenna 307 becomes shorter. As a result, the power transmission from the first power transmission antenna 203 and the second power transmission antenna 303 complement each other, which can keep the entire transmission efficiency almost constant.

In the wireless power supply device according to Embodiment 1, the transmission efficiency is averaged in a state where the power supply target 200 is installed at equal distances (intermediate position) from the first power transmission antenna 203 and the second power transmission antenna 303 in the case where the same power is supplied to the first power transmission antenna 203 and the second power transmission antenna 303, the first power transmission antenna 203 and the second power transmission antenna 303 have the same structure and only power transmission directions of the power transmission surface 204 and the power transmission surface 304 differ as well as the first power receiving antenna 207 and the second power receiving antenna 307 have the same structure and only power receiving directions of the power receiving surface 206 and the power receiving surface 306 differ, therefore, stable power supply to the power supply target 200 can be realized if the power receiving antenna moves.

As described above, the fact that the power is supplied stably to the power supply target 200 if the power receiving antenna moves in the wireless power supply device according to Embodiment 1 will be explained with reference to FIG. 3, FIG. 4 and FIG. 5 in comparison with the related art.

Figure 3:
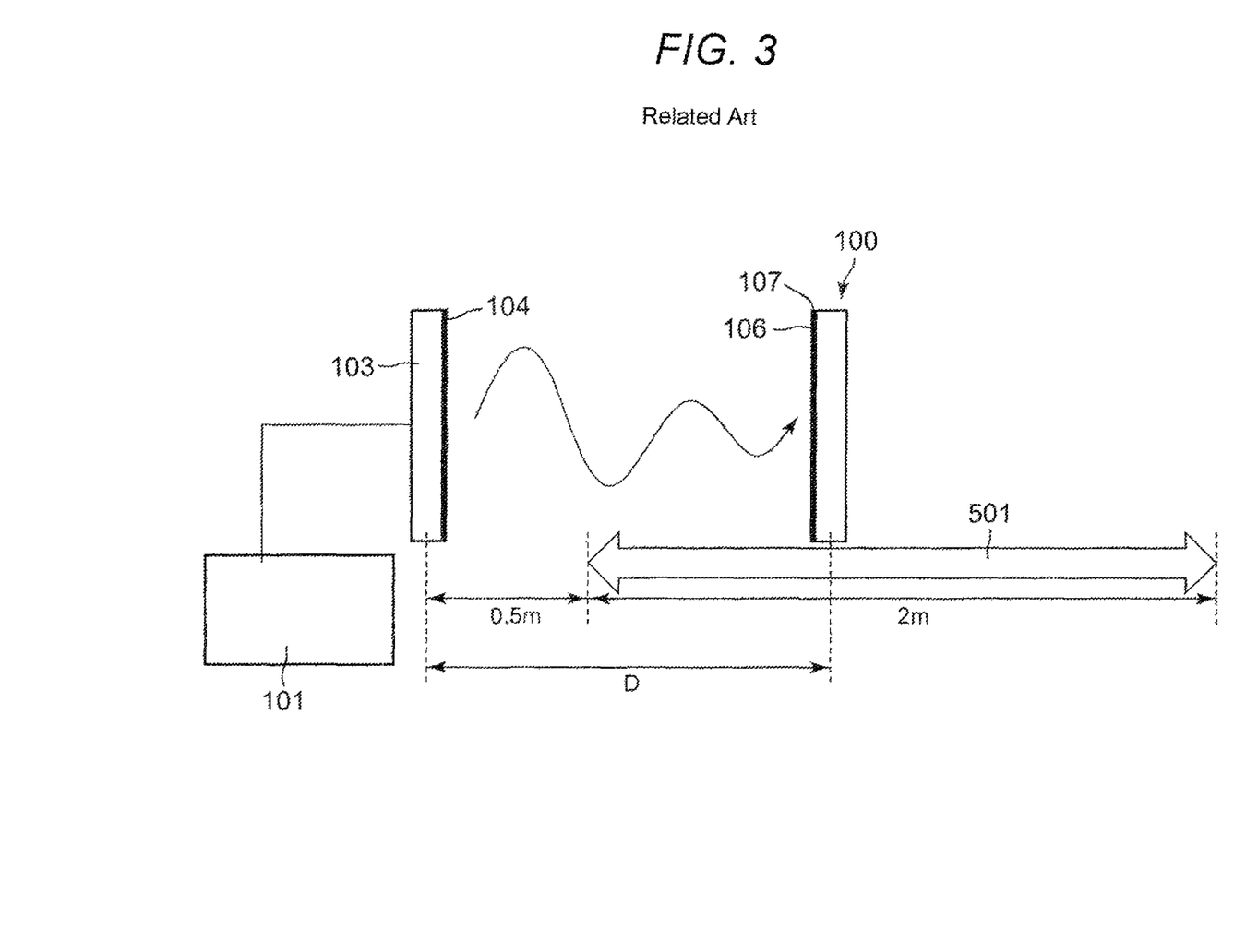
FIG. 3 is a view showing a positional relationship in a structure of a related-art wireless power supply device.

FIG. 3 shows a case of the structure of the above related-art wireless power supply device shown in FIG. 8 as an example, which is a schematic explanatory view showing a positional relationship obtained when the microwave power is transmitted to a power supply target 100 by using one power transmission antenna 103. In the structure shown in FIG. 3, an installation range 501 of the power supply target 100 is a range of a length 2 m on a straight line. FIG. 3 shows the positional relationship obtained when the microwave power is transmitted by one power transmission antenna 103 in a case where the power supply target 100 is arranged at an arbitrary position. In FIG. 3, planar antennas are used as the power transmission antenna 103 and the power receiving antenna 107, and the power transmission surface 104 of the power transmission antenna 103 and the power receiving surface 106 of the power receiving antenna 107 have the same shape for simplifying the structure. A distance between the power transmission antenna 103 and the power supply target 100 is set to D [m], and the distance D varies in a range between the minimum length 0.5 m to the maximum length 2.5 m. The constant power is supplied from one microwave generator 101 to the power transmission antenna 103.

Figure 5:
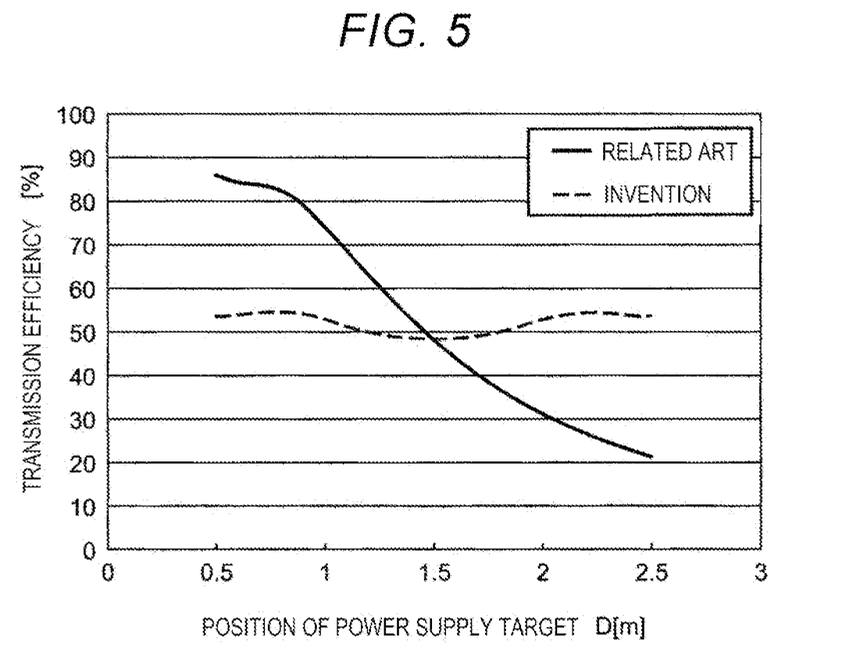
FIG. 5 is a graph showing the relation between the position with respect to a power supply target and the transmission efficiency.

FIG. 5 is a graph showing the relation between the transmission distance [m] as the position D of the power supply target 100 and the transmission efficiency [%] from the power transmission antenna 103 to the power supply target 100. FIG. 5 shows the relation between the transmission distance and the transmission efficiency at a frequency 5.8 GHz in a case where circular planar antennas with a size of 0.3 m in diameter are used as the power transmission antenna 103 and the power receiving antenna 107 by using a solid line.

Figure 4:
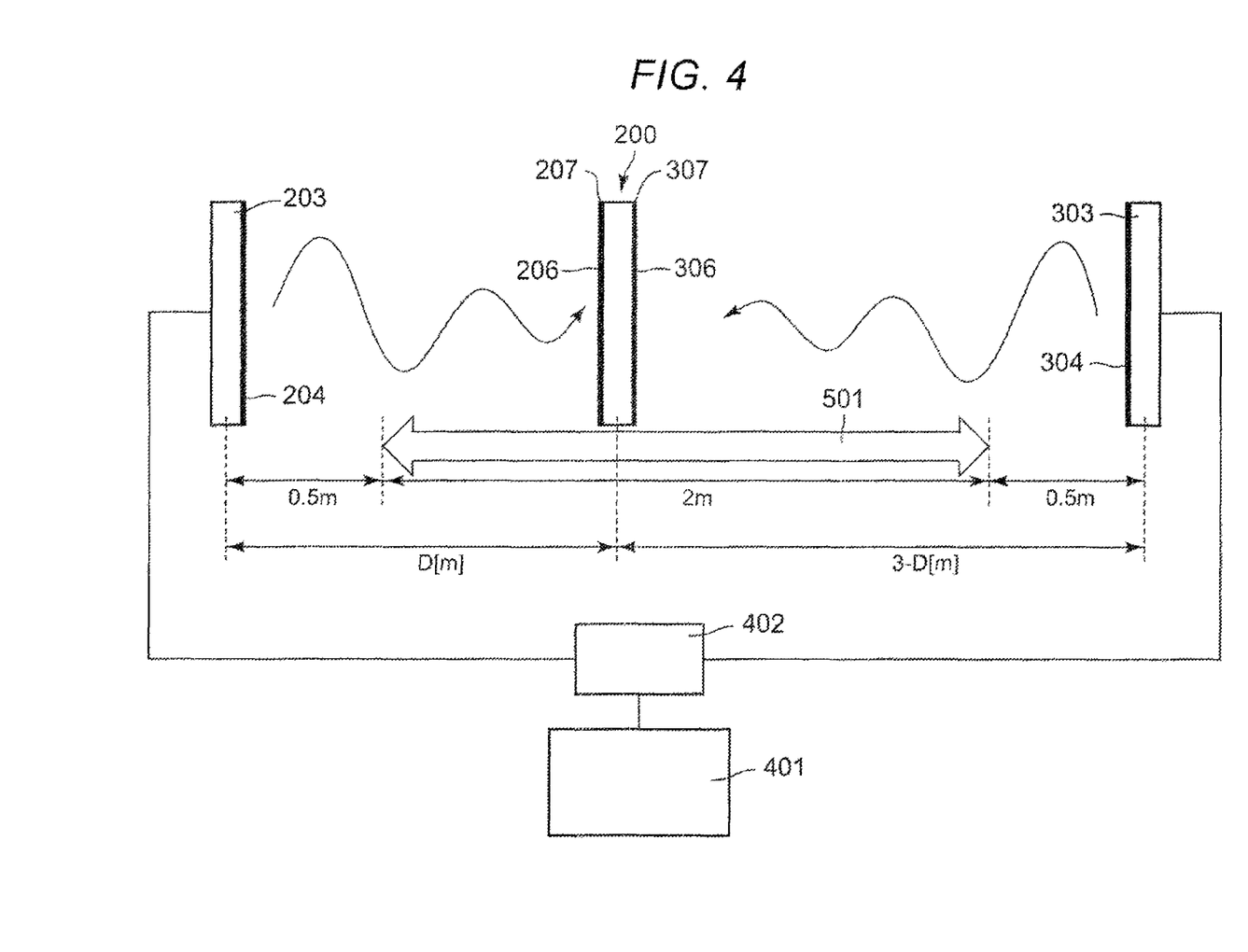
FIG. 4 is a view showing a positional relationship in the structure of the wireless power supply device according to Embodiment 1.

On the other hand, FIG. 4 is a schematic explanatory view showing a positional relationship obtained when the structure of the wireless power supply device according to Embodiment 1 shown in FIG. 2 is used. In FIG. 4, a distance between the first power transmission antenna 203 and the first power receiving antenna 207 is set to D [m], and the distance D varies in a range between the minimum length 0.5 m to the maximum length 2.5 m. The structure shown in FIG. 4 differs from the structure shown in FIG. 3 in points that the second power transmission antenna 303 having the same structure as the first power transmission antenna 203 is provided in the opposite side of the first power transmission antenna 203 with respect to the power supply target 200 and that the power supply target 200 has the first power receiving antenna 207 for receiving microwaves emitted from the first power transmission antenna 203 and the second power receiving antenna 307 for receiving microwaves emitted from the second power transmission antenna 303. The first power receiving antenna 207 and the second power receiving antenna 307 have the same structure and directions in which these antennas receive the power differ by 180 degrees.

As described above, in the structure shown in FIG. 4, the first power transmission antenna 203 and the second power transmission antenna 303 have the same structure, and the microwave power generated from the microwave generator 401 supplying the constant power is divided into two equally by the microwave divider 402 to be supplied to the first power transmission antenna 203 and the second power transmission antenna 303. In the structure shown in FIG. 4, the power supply target 200 receives both microwaves from the first power transmission antenna 203 which is apart from the power supply target 200 by the distance D and microwaves from the second power transmission antenna 303 which is apart from the power supply target 200 by the distance (3 [m]-D [m]). The sum of power is supplied to the power supply target 200.

In the structure of FIG. 4, results obtained by calculating the relation between the position D of the power supply target 200 and the transmission efficiency at a frequency 5.8 GHz in a case where circular planar antennas with a size of 0.3 m in diameter are used as all the power transmission antennas 203, 303 and the power receiving antennas 207, 307 are shown in FIG. 5 by using a dotted line.

As can be seen from the graph shown by the dotted line in FIG. 5, the fluctuation of transmission efficiency due to the change of the transmission distance can be averaged (smoothed) by the structure of Embodiment 1. That is, in the structure in which one power transmission antenna 103 and one power receiving antenna 107 are used as shown in FIG. 3, the power transmission efficiency is 85% when the distance D between the power transmission antenna 103 and the power receiving antenna 107 is reduced to 0.5 m, whereas the power transmission efficiency is drastically reduced to 20% when the distance D is increased to 2.5 m, therefore, it can be found that the power transmission efficiency largely fluctuates due to the position of the power receiving antenna 107 of the power supply target 100.

On the other hand, in the structure of Embodiment 1 shown in FIG. 4, the power received from the first transmission antenna 203 with the power transmission efficiency 85% is added to the power received from the second transmission antenna 303 with the power transmission efficiency 20% when the distance D between the first transmission antenna 203 and the first power receiving antenna 207 is the shortest at 0.5 m. Accordingly, the entire power transmission efficiency will be (0.5×0.85+0.5×0.2)× 100=52.5 [%] in consideration that the microwave power is divided into two by the microwave divider 402. Conversely, when the distance D between the first transmission antenna 203 and the first power receiving antenna 207 is the longest at 2.5 m, the power transmission efficiency from the first transmission antenna 203 is 20% and the power transmission efficiency from the second power transmission antenna 303 is 85% which is converse to the case where the distance D is the shortest, because all the power transmission antennas 203, 303 and the power receiving antennas 207, 307 have the same structure. As a result, the entire efficiency is 52.5 [%], which is the same power transmission efficiency obtained when the distance D is the shortest at 0.5 [m].

As a result of calculating the power transmission efficiency by setting the distance D in a range from 0.5 m to 2.5 m based on the above concept, it can be found that the power transmission efficiency falls within a range from 49% to 54% in the structure of Embodiment 1. That is, the transmission efficiency fluctuates from 20% to 85% according to the position of the power transmission target 100 in the related-art wireless power supply device, however, the fluctuation of transmission efficiency is averaged to a range from 49% to 54%, and the stable power supply can be realized without being restricted by the position of the power receiving antenna of the power supply device 200.

Therefore, when respective power receiving antennas 207 and 307 (power receiving antennas) are arranged in an intermediate point on a straight line connecting between two power transmission antennas 203 and 303, namely, in an intermediate position where distances from respective power transmission antennas 203 and 303 are equal in the wireless power supply device according to Embodiment 1, the desired power can be supplied stably by setting the power to be transmitted and the antenna size whereby the desired power can be supplied wherever the power receiving antenna of the power supply target 200 is arranged on the straight line between two power transmission antennas.

In the structure of Embodiment 1, the power transmission efficiency may be reduced due to the interference by microwaves from the first power transmission antenna 203 and the second power transmission antenna 303. Also in the structure of Embodiment 1, there may be a danger that microwaves emitted from the first power transmission antenna 203 reaches the second power transmission antenna 303 and received there, or, conversely, there may be a danger that microwaves emitted from the second power transmission antenna 303 reaches the first power transmission antenna 203 and received there.

Figure 6:
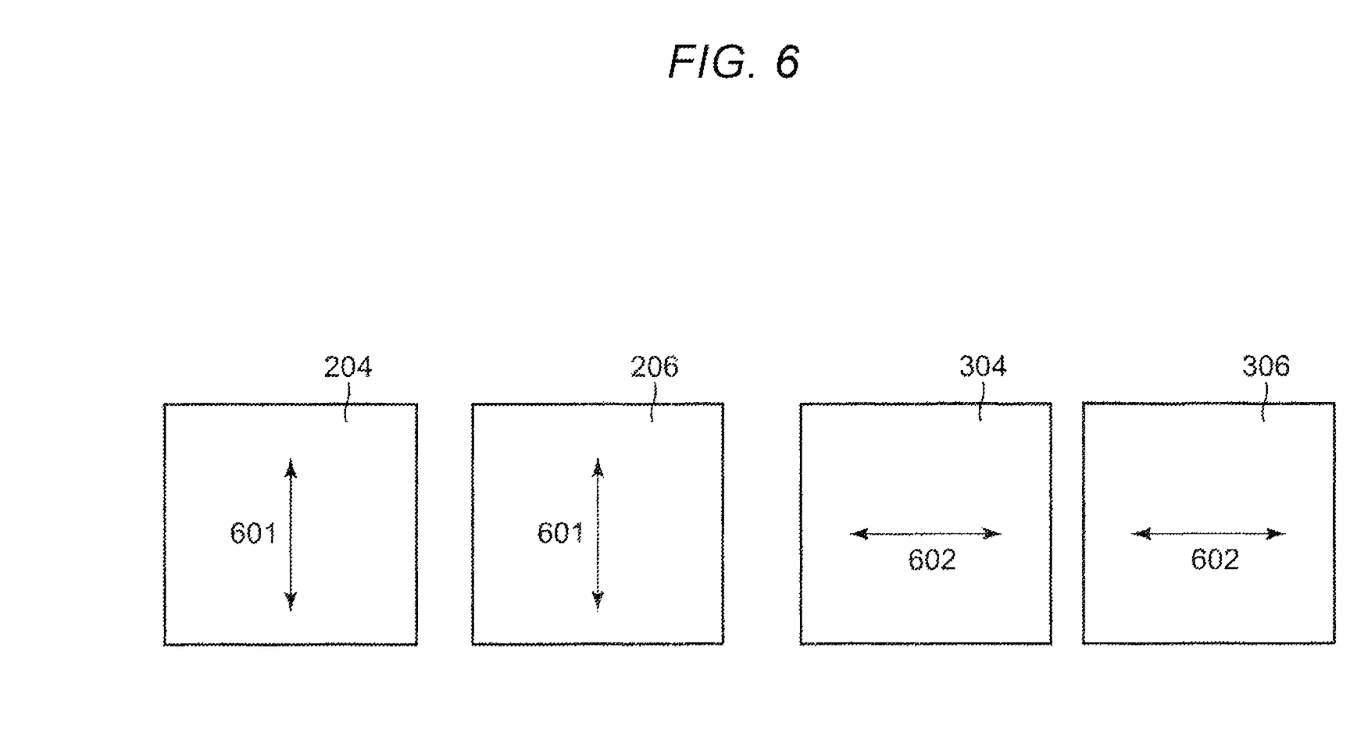
FIG. 6 show polarized wave directions in the wireless power supply device according to Embodiment 1.

Concerning the above problems, it is possible to prevent the interference of respective pairs of microwaves by regulating polarized waves of respective power transmission antennas and the power receiving antennas. Here, the polarized waves travel in a vibration direction of electric fields of emitted microwaves, and the electric fields commonly vibrate in a plane perpendicular to a travelling direction of microwaves. FIG. 6 shows views of the power transmission surfaces 204, 304 of the power transmission antennas 203, 303 and the power receiving surfaces 206, 306 of the power receiving antennas 207, 307 seen from the front. That is, FIG. 6 shows the power transmission surfaces 204, 304 and the power receiving surfaces 206, 306 which are orthogonal to the travelling direction of microwaves. Microwaves in a first polarized wave direction (electric field direction) 601 are emitted from the power transmission surface 204 of the first power transmission antenna 203, and the microwaves in the first polarized wave direction 601 are received by the power receiving surface 206 of the first power receiving antenna 207. Also, microwaves in a second polarized wave direction (electric field direction) 602 are emitted from the power transmission surface 304 of the second power transmission antenna 303, and the microwaves in the second polarized wave direction 602 are received by the power receiving surface 306 of the second power receiving antenna 307. In the wireless power supply device according to Embodiment 1, the first polarized wave direction 601 and the second polarized wave direction 602 of respective microwaves are directions of fixed linearly polarized waves, which are 90 degrees rotated. In the structure of Embodiment 1, the electric field direction (vibration direction of electric fields) of the power transmission surface 204 and the electric field direction (vibration direction of electric fields) of the power receiving surface 206 are fixed to the vertical direction as the first polarized wave direction 601, and the electric field direction of the power transmission surface 304 and the electric field direction of the power receiving surface 306 are fixed to the horizontal direction as the second polarized wave direction 602, thereby forming the relationship in which respective polarized wave directions are 90 degrees rotated.

Though the first polarized wave direction 601 shown in FIG. 6 is regarded as the vertical direction and the second polarized wave direction 602 is regarded as the horizontal direction in the above explanation, the power supply device is not limited to the structure of FIG. 6 as long as an angle of the first polarized wave direction 601 is 90 degrees rotated with respect to the second polarized wave direction 602.

As a method of rotating the polarized waves by 90 degrees, a method of arranging the entire antenna to be rotated by 90 degrees, a method of shifting the polarized waves by designing antennas respectively can be considered, however, the power supply device is not limited to these methods. As the vibration directions of electric fields differ by 90 degrees in microwaves emitted from the first power transmission antenna 203 and microwaves emitted from the second power transmission antenna 303 in the power supply device, the interference of respective microwaves can be prevented and the wireless power supply can be performed with high stability. The risk that microwaves emitted from the first power transmission antenna 203 are received by the second power transmission antenna 303, and conversely, the risk that microwaves emitted from the second power transmission antenna 303 are received by the first power transmission antenna 203 can be reduced.

Additionally, the angle of the polarized wave direction is not limited to 90 degrees as long as the microwaves emitted from the first power transmission antenna 203 are not received by the second power transmission antenna 303 and the microwaves emitted from the second power transmission antenna 303 are not received by the first power transmission antenna 203.

Figures 7A, 7B:
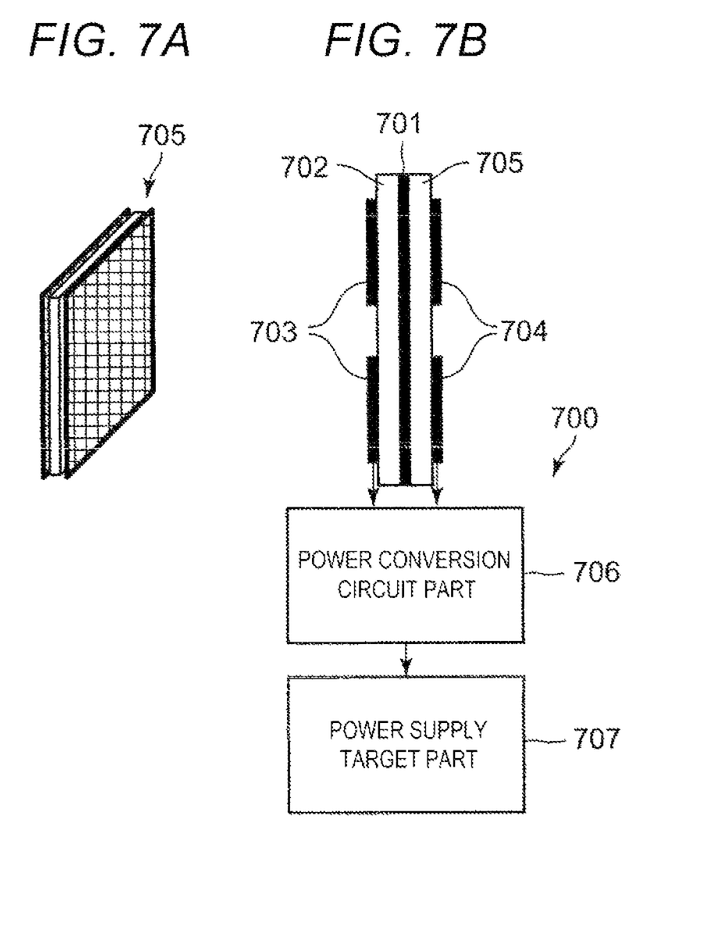
FIGS. 7A and 7B are views showing a power receiving antenna of another structure in the wireless power supply device according to Embodiment 1.

FIGS. 7A and 7B are views showing another structural example of the power supply target as a power supply target 700 having a power receiving antenna part 705 in the wireless power supply device according to Embodiment 1. FIG. 7A is a perspective view of the power receiving antenna part 705 and FIG. 7B is a view showing a structural example of the power receiving antenna part 705. As shown in FIG. 7B, the power receiving antenna part 705 is connected to a power supply target part 707 through a power conversion circuit part 706 in the power supply target 700. The power receiving antenna part 705 is provided with power receiving surfaces on both sides thereof, which can receive microwaves from opposite directions, namely, both directions which are 180 degrees rotated. In the structural example shown in FIG. 7, the power receiving antenna part 705 is a microstrip antenna formed of a microstrip substrate, in which a first antenna pattern 703 and a second antenna pattern 704 which are conductive patterns are formed on both surfaces of the substrate. The microstrip antenna is formed by one-side power receiving surface (antenna surface) and a dielectric substrate 702 sandwiching a ground surface (GND surface) 701, and two power receiving surfaces can be formed on one substrate by using the GND surface 701 in common by the power receiving antennas of both sides. As it is not necessary to separate the power from two receiving surfaces in the power conversion circuit part 706, the power can be converted by the common circuit. According to the power receiving antenna part 705 having the above structure, it is not necessary to use plural antenna substrates and plural power receiving circuits with respect to the power supply target part 707, therefore, a small-sized power receiving antenna can be constructed.

The structural example in which respective two pairs of antennas are provided for power transmission and power reception, and these antenna pairs are arranged on one-axis straight line has been explained in Embodiment 1, and it is also possible to increase the number of axes and to increase the number of antenna pairs in the power supply device according to the present embodiment. That is, the power supply device according to the present embodiment includes the structure in which two pairs of antennas, which are, a pair of the first power transmission antenna (203) and the first power receiving antenna (207) and a pair of the second power transmission antenna (303) and the second power receiving antenna (307) are arranged on one-axis straight line as well as a pair of the power transmission antennas and the power receiving antennas having the same structure are arranged on a straight line which is in parallel and on a different axis.

As the power transmission antenna in Embodiment 1, a microstrip antenna, an array antenna in which many microstrip antennas are arranged, a horn antenna and so on can be considered as antennas with high directivity, however, the power supply device is not limited to these antennas. As the microwave generator, there are a high-frequency signal generator, a high-frequency amplifier, magnetron and so on, however, the power supply device is not limited to these microwave generators.

The example in which the power supply target is integrally provided with the pair of power receiving antennas which are the first power receiving antenna 207 and the second power receiving antenna 307 has been explained in Embodiment 1, and it is also preferable that the power supply target is electrically connected to the pair of power receiving antennas so that the power is supplied from the pair of power receiving antennas, and that the pair of power receiving antennas are arranged in an area in which the first power transmission antenna 203 (power transmission surface 204) faces the second power transmission antenna 303 (power transmission surface 304).

The wireless power supply device according to the above exemplary embodiments is a highly versatile device capable of supplying the power stably regardless of the position of the power receiving antenna of the power supply target, which can be applied to various applications in wireless power supply to mobile objects.

What is claimed is:

1. A wireless power supply device comprising:
    a microwave generator for generating microwaves;
    a first power transmission antenna to which microwaves generated by the microwave generator are supplied;
    a second power transmission antenna to which microwaves generated by the microwave generator are supplied;
    a first power receiving antenna provided between a power transmission surface of the first power transmission antenna and a power transmission surface of the second power transmission antenna, having a power receiving surface facing the power transmission surface of the first power transmission antenna; and
    a second power receiving antenna provided between the power transmission surface of the first power transmission antenna and the power transmission surface of the second power transmission antenna, having a power receiving surface facing the power transmission surface of the second power transmission antenna,
    wherein the first power receiving antenna and the second power receiving antenna are integrally formed and connected to a power supply target, a direction in which the power receiving surface of the first power receiving antenna faces the power transmission surface of the first power transmission antenna is parallel to a direction in which the power receiving surface of the second power receiving antenna faces the power transmission surface of the second power transmission antenna,
    wherein the first power transmission antenna and the second power transmission antenna transmit microwaves of linearly polarized waves, and
    vibration directions of electric fields are different in microwaves transmitted from the first power transmission antenna and microwaves transmitted from the second power transmission antenna.

2. The wireless power supply device according to claim 1, wherein the power transmission surface of the first power transmission antenna and the power transmission surface of the second power transmission antenna are arranged so as to face each other, and
    the power receiving surface of the first power receiving antenna and the power receiving surface of the second power receiving antenna are arranged in an area where the power transmission surface of the first power transmission antenna faces the power transmission surface of the second power transmission antenna.

3. The wireless power supply device according to claim 1, wherein plural microwave generators are provided and configured to supply the same power to the first power transmission antenna and the second power transmission antenna.

4. The wireless power supply device according to claim 1, further comprising:
a microwave divider for dividing the power supplied from the microwave generator,
wherein the same power is supplied to the first power transmission antenna and the second power transmission antenna from the microwave divider.

5. The wireless power supply device according to claim 1, wherein the first power transmission antenna and the second transmission antenna have the same structure, and
the first power receiving antenna and the second power receiving antenna have the same structure.

6. The wireless power supply device according to claim 1, wherein the power supply target to which the power from the first power receiving antenna and the second power receiving antenna is supplied is integrally formed with the first power receiving antenna and the second power receiving antenna.

7. The wireless power supply device according to claim 1, wherein the first power receiving antenna and the second power receiving antenna are formed of a microstrip substrate,
respective power receiving surfaces of the first power receiving antenna and the second power receiving antenna are formed by conductive patterns provided on both surfaces of the microstrip substrate, and
a ground surface provided in the microstrip substrate is used in common by the first power receiving antenna and the second power receiving antenna.

8. The wireless power supply device according to claim 1, wherein plural pairs of power receiving antennas having the same structure as the first power receiving antenna and the second power receiving antenna which are integrally formed are provided in an area where the power transmission surface of the first power transmission antenna faces the power transmission surface of the second power transmission antenna which are arranged so as to face each other.

9. A wireless power supply device comprising:
a microwave generator for generating microwaves;
a first power transmission antenna to which microwaves generated by the microwave generator are supplied;
a second power transmission antenna to which microwaves generated by the microwave generator are supplied;
a first power receiving antenna provided between a power transmission surface of the first power transmission antenna and a power transmission surface of the second power transmission antenna, having a power receiving surface facing the power transmission surface of the first power transmission antenna; and
a second power receiving antenna provided between the power transmission surface of the first power transmission antenna and the power transmission surface of the second power transmission antenna, having a power receiving surface facing the power transmission surface of the second power transmission antenna,
wherein the first power receiving antenna and the second power receiving antenna are integrally formed and connected to a power supply target, a direction in which the power receiving surface of the first power receiving antenna faces the power transmission surface of the first power transmission antenna is parallel to a direction in which the power receiving surface of the second power receiving antenna faces the power transmission surface of the second power transmission antenna,
wherein the first power transmission antenna and the second power transmission antenna transmit microwaves of linearly polarized waves, and
vibration directions of electric fields in microwaves transmitted from the first power transmission antenna and microwaves transmitted from the second power transmission antenna are orthogonal to each other.

* * * * *